F. WESTERBECK.
SPRING WHEEL.
APPLICATION FILED FEB. 11, 1909.
960,749.
Patented June 7, 1910.
3 SHEETS—SHEET 1.
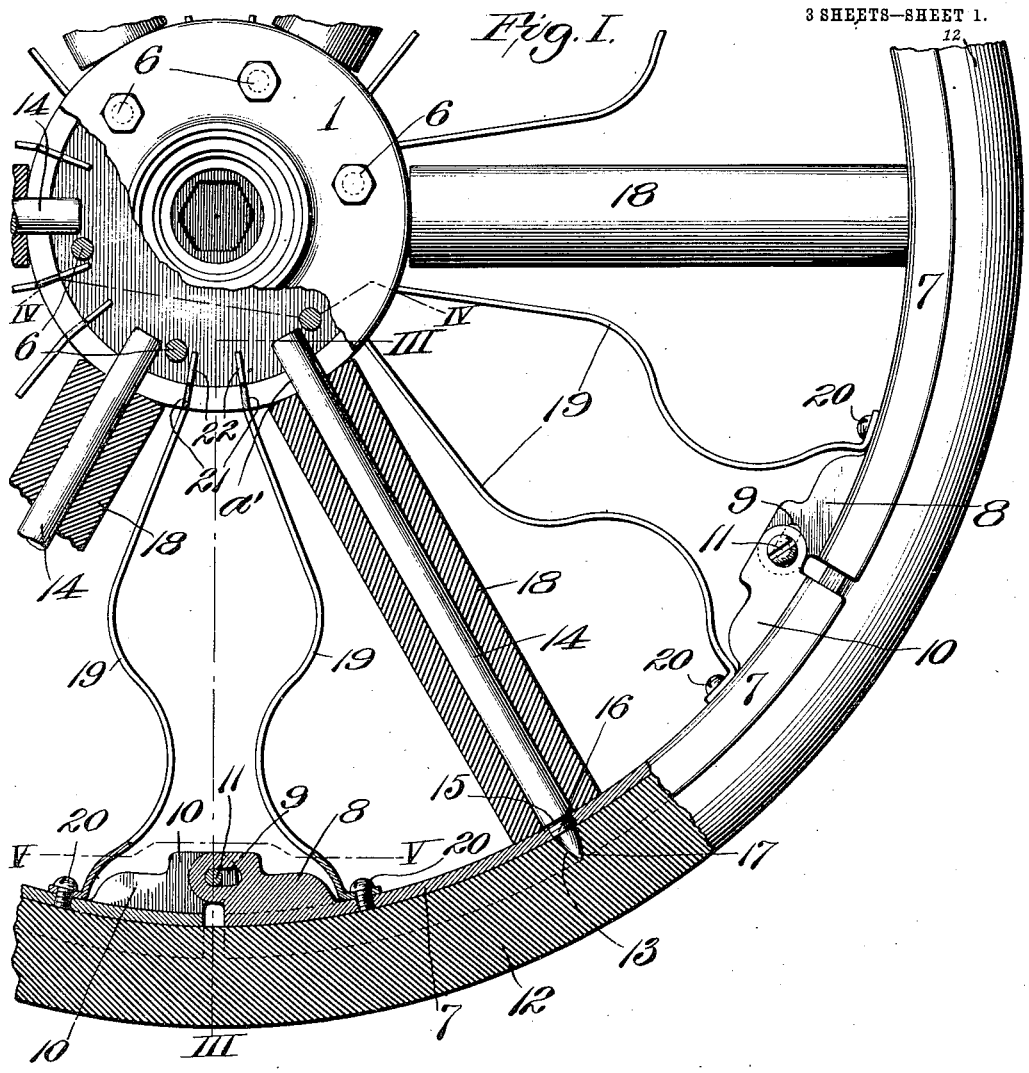
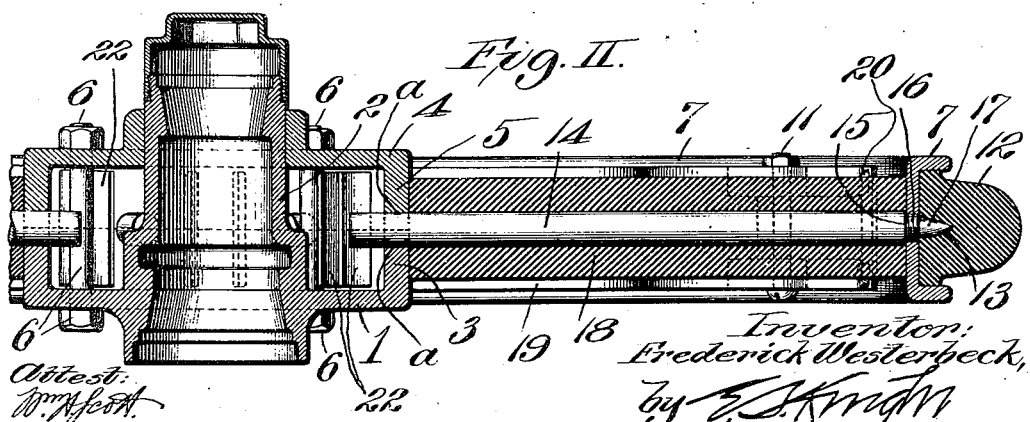

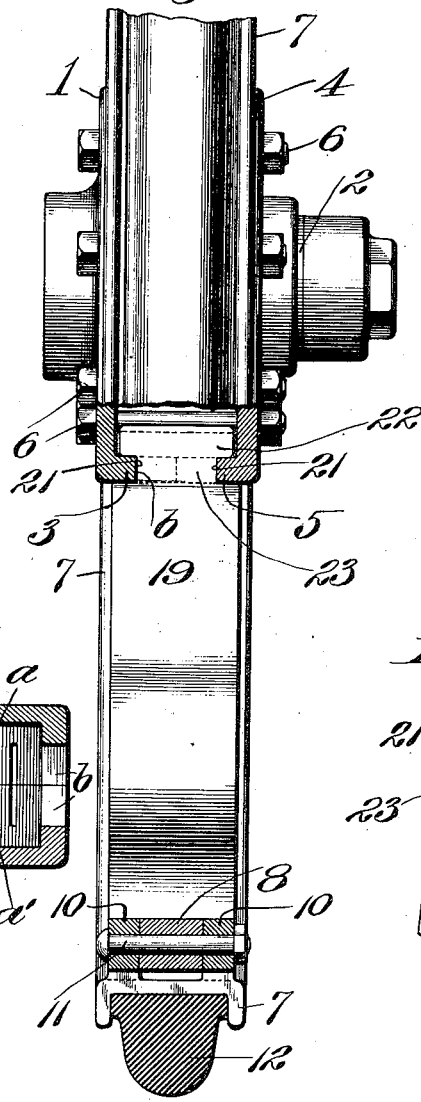
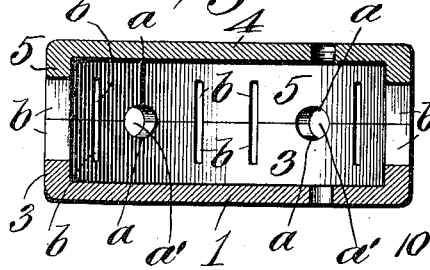
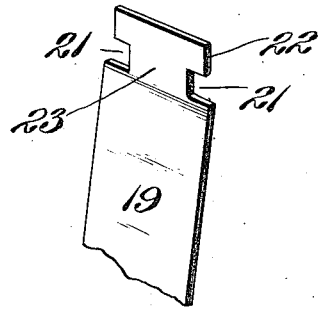

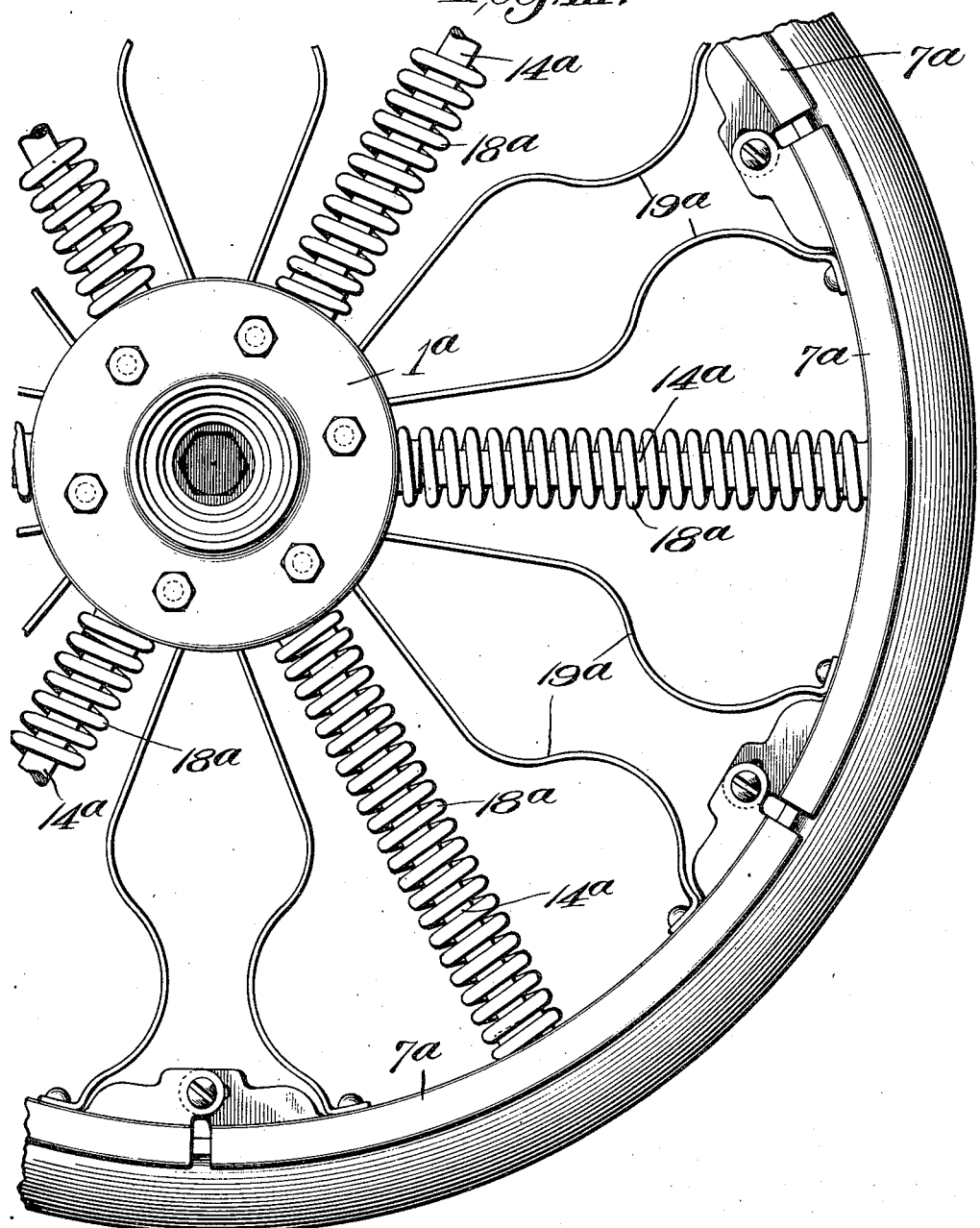

UNITED STATES PATENT OFFICE.

FREDERICK WESTERBECK, OF ST. LOUIS, MISSOURI.

SPRING-WHEEL.

960,749.  Specification of Letters Patent.  Patented June 7, 1910.

Application filed February 11, 1909. Serial No. 477,406.

*To all whom it may concern:*

Be it known that I, FREDERICK WESTERBECK, a citizen of the United States of America, residing in the city of St. Louis, in the State of Missouri, have invented certain new and useful Improvements in Spring-Wheels, of which the following is a full, clear, and exact description, reference being had to the accompanying drawings, forming part of this specification.

My invention relates to a spring wheel for vehicles, and is more particularly intended for use in motor vehicles, the invention having for its object the production of a spring wheel of simple, durable, and efficient construction that will provide the desired resiliency in the wheel, and which comprises spokes movable toward and away from the axis of the wheel and serving to hold the spring members in their proper relative positions while permitting action thereof in the use of the wheel.

The wheel further comprises a sectional rim with the sections of which the spokes and springs are associated in sets in combination with the hollow hub of the wheel, thereby permitting independent operation of the rim sections and the spokes and springs associated therewith.

Figure I is a view of a portion of my wheel shown partly in side elevation and partly in vertical section. Fig. II is a transverse section through a part of the wheel. Fig. III is in part an edge elevation and in part a cross section taken on line III—III, Fig. I. Fig. IV is a cross section of the hollow hub taken on line IV—IV, Fig. I. Fig. V is a cross section taken on line V—V, Fig. I. Fig. VI is a perspective view of the inner end of one of auxiliary springs. Fig. VII is an elevation illustrating a modification.

In the accompanying drawings:—1 designates one of the sections of the hollow hub of my wheel and 4 a hub section companionable with the section 1. The hub section 1 is formed with a central journal sleeve 2 extending from the inner side thereof, and with a flange 3 that extends from the side of the section and surrounds the hub sleeve. The hub section 4 is provided with a central opening to receive the hub sleeve of the section 1 and has a flange 5 that abuts against the flange 3 of the section 1. In the edges of the flanges of the two hub sections are semicircular notches $a$ that register with each other when the sections are assembled to furnish a plurality of radial spoke receiving apertures $a'$, seen most clearly in Fig. IV. In the edges of these flanges are also registering transverse slots $b$ that receive auxiliary springs, as will hereinafter appear. The hub sections 1 and 4 are held assembled, so that their flanges abut against each other, by tie-bolts 6 that pass transversely through said sections.

The rim of my wheel is composed of a plurality of sections 7, preferably of channel shape, and the several sections are loosely connected at their ends so that the sections may partake of circumferential movement independent of each other while serving combinedly to constitute the wheel rim. Each rim section is provided at one end with an ear 8 containing a slot 9 and at its other end with an ear 10 in which is mounted a pin 11 adapted to operate in the slot 9 of the ear companionable therewith. The slot and pin connection produced in the ears of the sections serves to so unite the sections as to permit of any particular section in the wheel rim partaking of a longitudinal movement or, more particularly speaking, of a movement in the arc of the circle occupied by the several rim sections.

12 is a tire fitted to the wheel rim and provided at intervals with conoidal sockets 13, (see Figs. I and II.)

14 designates the spokes of my wheel. These spokes are preferably in the form of round rods and their inner portions are loosely seated in the spoke apertures $a'$ at the perimeter of the wheel hub in order that the spokes may play in a longitudinal direction in said hub and radially of the wheel. The spokes are provided at their outer ends with shoulders 15 that rest against the rim sections 7, preferably at a point midway of the lengths of the sections, (as seen in Fig. I). Each spoke extends through the rim section with which it is associated and preferably has screw threaded engagement therewith, as seen at 16, in order that the spoke may be held to the rim section. Each spoke also has at its outer end a conoidal extension 17 that protrudes beyond the rim, and enters into the conoidal socket 13 in the tire 12 for its reception whereby said extensions serve as means to prevent creeping of the tire around the wheel rim.

18 designates spoke springs which, in the form illustrated in Figs. I and II, are tubular pieces of rubber and surround the spokes 14. These springs serve to control the inward movement of the spokes in the hub of the wheel when pressure is exerted against the tire and consequently against the wheel rim, at which time the spokes play loosely in the hub and partake of longitudinal movement therein radially of the wheel.

19 designates auxiliary springs made of flat bars or strips of metal, preferably steel arranged in pairs, each auxiliary spring being bent to produce compounds curves therein, as most clearly seen in Fig. I, in order that the springs will flex under strain applied thereto in the direction of their lengths.

The outer outbent ends of the auxiliary springs are secured by suitable means, such as screws 20 to the rim sections 7. In the edges of the auxiliary springs near their inner ends are notches 21, and at the inner ends ends of the springs in juxtaposition to said notches are heads 22 that are joined to the bodies of the springs by necks 23 such being formed by the production of the notches in the springs. The notches 21 produce T-shaped inner ends on the springs 19. The necks 23 of the springs are adapted to occupy the slots $b$ in the flanges 3 and 5 of the hub sections 1 and 4, while the inner ends of the bodies of the springs rest against the perimeters of the hub section flanges and the heads 22 of the springs occupy positions against the inside faces of said flanges. It will therefore be seen that when the hub sections are assembled and united, the inner ends of the auxiliary springs are held by the hub sections in a manner to prevent longitudinal movement of the springs in either direction within the slots.

During the use of my vehicle wheel, the tire when treading upon the ground acts to exert pressure against the rim section or rim sections 7 that are lowermost from time to time in the rotation of the wheel, these sections being loosely connected in such manner as to approach the axis of the wheel. As each section moves toward the axis of the wheel, it carries with it the spoke 14 fitted thereto, whereby said spoke is caused to play in the wheel hub and the spoke spring surrounding the spoke and interposed between the rim and the hub is brought into action. At the same time, the auxiliary springs 19 are flexed due to the movement of the rim sections that are lowermost toward the axis of the wheel so that they act in conjunction with the spoke springs to furnish resiliency in the wheel intermediate of the spokes and spoke springs.

In Fig. VII I have shown a modification in which $1^a$ designates the hub of a wheel, $7^a$ the rim sections, $14^a$ the spokes, and $19^a$ the auxiliary springs. The parts just mentioned are assembled in a manner similar to that hereinbefore described, the wheel in this modification differing only in construction from the one previously described in that instead of using tubular spoke springs of rubber, or analogous resilient material, I employ coiled spoke springs $18^a$ that encircle the several spokes of the wheel.

I claim:—

A wheel comprising a hollow hub formed with radial apertures and transverse slots, a rim consisting of jointed sections, spokes each having free sliding connection in a radial aperture of the hollow hub and rigidly secured to a rim section, springs surrounding the spokes between the hollow hub and the rim sections, and paired auxiliary springs between the spokes each having compound curves, a T-shaped end engaging in a transverse slot of the hollow hub and an out-bent end secured to a rim section.

FREDERICK WESTERBECK.

In the presence of—
Wm. H. Scott,
H. G. Cook.